(12) United States Patent
Gandelheidt

(10) Patent No.: US 7,540,291 B2
(45) Date of Patent: Jun. 2, 2009

(54) METHOD AND DEVICE FOR CLEANING A BLOWING HEAD FOR PLASTIC FILMS

(75) Inventor: Edgar Gandelheidt, Worms (DE)

(73) Assignee: Kiefel Extrusion GmbH, Worms (DE)

( * ) Notice: Subject to any disclaimer, the term of this patent is extended or adjusted under 35 U.S.C. 154(b) by 496 days.

(21) Appl. No.: 11/059,923

(22) Filed: Feb. 17, 2005

(65) Prior Publication Data

US 2005/0178407 A1 Aug. 18, 2005

(30) Foreign Application Priority Data

Feb. 18, 2004 (DE) .................. 10 2004 007 929

(51) Int. Cl.
  *B08B 7/00* (2006.01)
  *B08B 9/00* (2006.01)
(52) U.S. Cl. .................. 134/22.18; 134/22.12; 134/19
(58) Field of Classification Search .................. 134/19, 134/20, 21, 22.1, 22.11, 22.12, 22.18, 26, 134/30, 34, 37, 38; 425/210, 225, 226, 227, 425/228, 229, 230, 231
See application file for complete search history.

(56) References Cited

U.S. PATENT DOCUMENTS 3,228,064 A * 1/1966 Plummer .................. 425/151
4,233,496 A * 11/1980 Weber et al. .................. 219/390
4,605,365 A * 8/1986 Upmeier .................. 425/72.1
4,919,161 A * 4/1990 Schmidt .................. 134/108
5,485,858 A * 1/1996 Schmidt .................. 134/107

FOREIGN PATENT DOCUMENTS

EP        95038 A  * 11/1983
JP    11207278 A  *  8/1999

* cited by examiner

*Primary Examiner*—Alexander Markoff
(74) *Attorney, Agent, or Firm*—Cohen Pontani Lieberman & Pavane LLP

(57) ABSTRACT

In a first phase, after completion of a production process for plastic films, the blowing head is heated by the heater that is present to a temperature above the melting temperature of the plastic remaining in the blowing head to liquefy the same. In a second phase, at the latest after the liquefied plastic has run out, at least the region of the blowing head that is in contact with the plastic is sealed off from the ambient atmosphere and purged of its oxygen-containing atmosphere. The head is then heated far above the decomposition temperature of the plastic still remaining, and the gaseous products thereby occurring are discharged. At the end of the decomposition phase of the remaining plastic, the blowing head is flushed through with a gas which contains at least a proportion of oxygen, in order to carry out an incineration of residual particles.

7 Claims, 1 Drawing Sheet

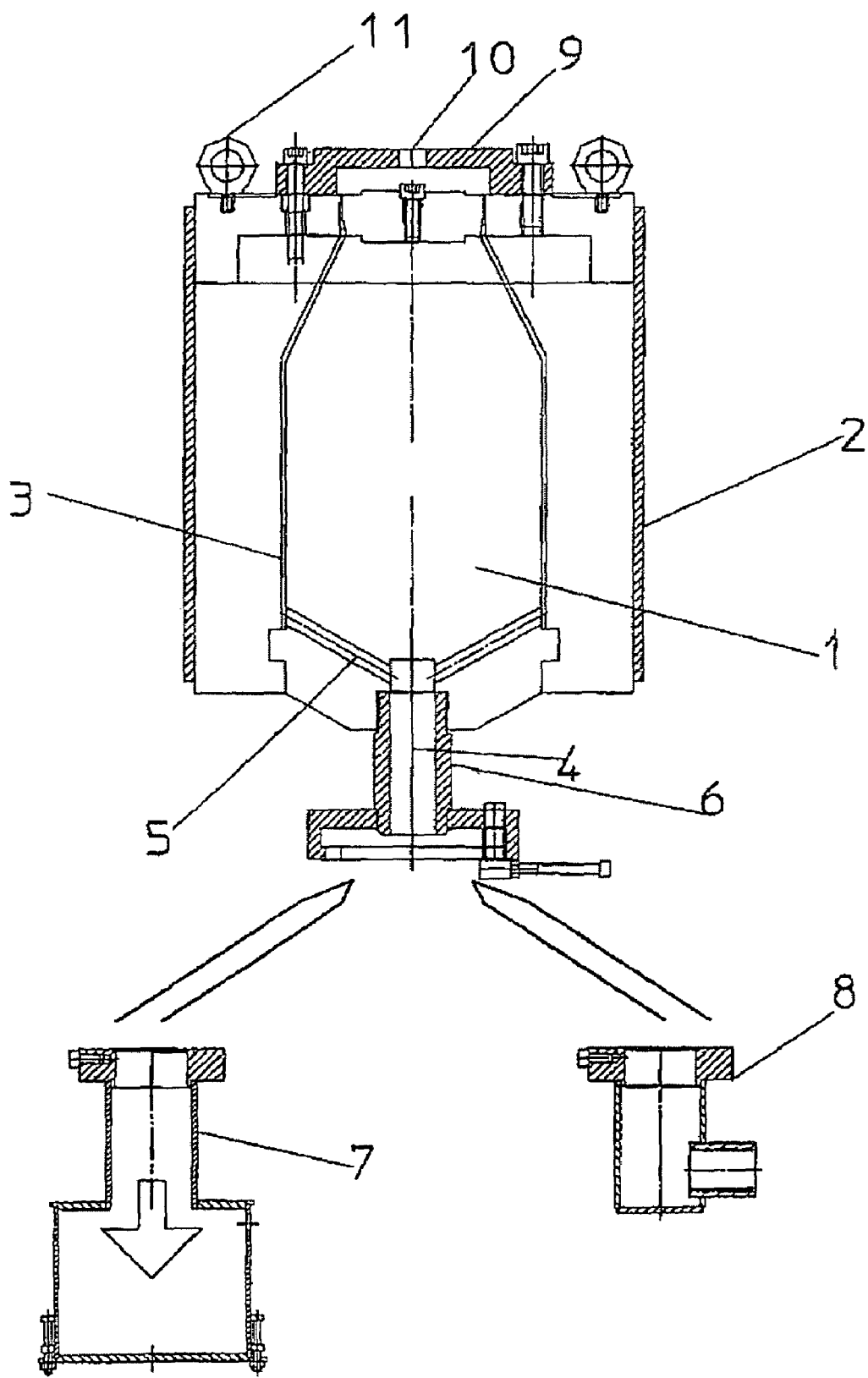

METHOD AND DEVICE FOR CLEANING A BLOWING HEAD FOR PLASTIC FILMS

BACKGROUND OF THE INVENTION

1. Field of the Invention

The invention relates to a method for cleaning a blowing head for plastic films which is kept at operating temperature by a heater during the production of films. The invention also relates to a device for carrying out the method.

2. Description of the Related Art

Blowing heads are used to feed an annular die from a round melt strand as it emerges from an extruder. The blowing heads are used in designs as mono-blowing heads for one layer of melt and as coextrusion blowing heads for a number of layers. The blowing heads must be cleaned after specific production intervals. During the cleaning, the plastic must be removed completely from the blowing head. Methods for cleaning parts soiled with polymer are already known. One of the known methods is based on fluidized bed cleaning. The component to be cleaned is suspended in a bed of quartz sand. The quartz sand lies on a tuyere bottom, through which a mixture of combustible gas and air is blown. The burning gas flowing through causes the sand to undergo turbulent movements. The cleaning effect is obtained as a result of the high temperature of the sand and the abrasive action of the flow of the sand.

In the case of a further known method, the cleaning is carried out in a vacuum chamber with the exclusion of oxygen. The blowing head is heated by means of radiant heaters. Some of the polymer melt flows out of the blowing head. Subsequently, the temperature is further increased. The remaining melt decomposes as a result of cracking of the macromolecules into the monomers such as $CH_4$, $C_2H_6$, $CO$, $CO_4$, $H_2$. The gases thereby produced are discharged via a catalyst and converted into $CO_2$ and $H_2O$. By contrast with the fluidized bed method, cleaning of the inner regions of the blowing head is also possible.

A disadvantage of both methods is the fact that the blowing head has to be completely disassembled before cleaning. In the case of the fluidized bed method, only the regions of the component that can be reached by the cleaning sand can be cleaned.

In the case of the second known method, there is the disadvantage that the blowing head is only heated by means of radiant heaters. The great volume in the cleaning oven in comparison with the free volume in the blowing head makes it much more difficult to reduce the amount of oxygen in the surrounding air. When disassembling the blowing head from the extrusion installation, all the additional components such as temperature sensors and band heaters must also be removed. The investment expenditure for such vacuum cleaning installations is very high.

SUMMARY OF THE INVENTION

The object of the invention is to devise a way of cleaning a blowing head for plastic films in such a way that all the regions that come into contact with plastic during the production of films can be cleaned and the expenditure can be significantly restricted.

Initially, in a first phase according to the invention, after completion of the production process, the blowing head is heated by the heater that is present to a temperature above the melting temperature of the plastic remaining in the blowing head to liquefy the plastic. In a second phase, at the latest after the liquefied plastic has run out, at least the region of the blowing head that is in contact with the plastic is sealed off from the ambient atmosphere and purged of its oxygen-containing atmosphere and is heated far above the decomposition temperature of the plastic still remaining, and the gaseous products thereby occurring are discharged. At the end of the decomposition phase of the remaining plastic, the blowing head is flushed through with a gas which contains at least a proportion of oxygen, in order to carry out an incineration of residual particles.

This type of method is accompanied by several advantages. Since the heater required on the blowing head for producing the films is used for the cleaning operation, an additional investment, for example for radiant heaters and for a vacuum chamber, is no longer required. Furthermore, the residual heat of the blowing head can be used, since the cleaning phase can follow on immediately after production.

In a further refinement of the invention, it is provided that, to seal off the region of the blowing head that is in contact with plastics from the atmosphere, the inlet and outlet openings for the polymer melt are closed with plugs which have connections for the supply of inert gas and an oxygen-containing gas and also connections for the removal of the melt, for the discharge of waste gases occurring and for the evacuation of this region.

If, in a development of the invention, for the cleaning of the blowing head, it remains in the extrusion installation, this avoids considerable disassembly effort that is necessary to transfer the parts to be cleaned either into a fluidized bed or into a vacuum chamber, it also being necessary during this disassembly to remove and reattach the supply lines for temperature sensors and the heater. Leaving the blowing head in the extrusion installation reduces assembly time and expenditure for additional installations, such as vacuum chambers for example, to the extent that the necessary investment costs just for one installation are commercially acceptable.

In a development of the invention, to achieve an oxygen-free atmosphere in the blowing head, it may be flushed through with an inert gas. Furthermore, it is possible to achieve an oxygen-free atmosphere in the blowing head by evacuating it.

It may be advantageous to carry out the operation of flushing with inert gas at the beginning of the cleaning operation.

The oxygen-containing flushing gas may advantageously be ambient air, ambient air enriched with oxygen or pure oxygen.

A device for carrying out the method comprises the feature that the blowing head is designed with a lower plug, which optionally allows melt to be supplied, melt to be discharged and gas to be discharged. In this case, it is not necessary to detach the blowing head from the melt supply in order to attach this plug, which reduces the assembly effort in each instance of cleaning.

It is also possible, however, for the blowing head to be detachably connected to the melt supply and formed with devices for raising it from the latter to introduce a plug. The assembly effort is thereby restricted to detaching the blowing head from the melt supply and raising the same in order to attach a plug with the appropriate connections for the melt discharge or the discharge of the waste gas occurring.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE is a section through a blowing head with the plugs necessary for cleaning.

DETAILED DESCRIPTION OF THE PRESENTLY PREFERRED EMBODIMENTS

Referring to the FIGURE, the blowing head 1 has band heaters 2 which produce sufficient heat to decompose any plastic remaining in the blowing head after production. The blowing head has a lower plug 6 with lower opening 4 for introducing a layer of melt 3 via the runners 5. The lower plug 6 can also be connected to a collecting container 7 for melted plastic, or to a connection 8 for discharging gas produced by decomposing plastic. The blowing head 1 also has an upper plug 9 with a connection 10 for supplying inert gas such as nitrogen. Ring bolts 11 permit the blowing head to be raised for introducing the lower plug 6. The blowing head 1 may also be raised by a forklift, which can engage the bottom.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for cleaning a blowing head for plastic films after completion of production while the blowing head remains installed in an extrusion installation, the blowing head having a region that is in contact with plastic, the plastic having a melting temperature and a decomposition temperature, the method comprising the following steps:
   in a first cleaning phase, heating the blowing head with a heater contacting the blowing head to a temperature above the melting temperature of the plastic until the plastic runs out;
   in a second cleaning phase,
     sealing off at least the region of the blowing head that is in contact with plastic from the ambient atmosphere,
     purging the region of the blowing head of any oxygen-containing atmosphere,
     heating the blowing head with the heater above the decomposition temperature of the plastic until any plastic remaining in the blowing head decomposes to produce gaseous products and residual particles,
     discharging the gaseous products; and
   in a third cleaning phase, flushing the blowing head with an oxygen-containing gas in order to incinerate the residual particles, thereby cleaning the blowing head while the blowing head remains installed in the extrusion installation.

2. The method of claim 1 wherein the region of the blowing head that is in contact with plastic is provided with inlet and outlet openings for melted plastic, the sealing off of said region comprising closing said openings with plugs, the plugs having connections for the supply of inert gas and oxygen containing gas, and connections for the removal of melted plastic, for the discharge of said gaseous products, and for evacuating the region.

3. The method of claim 1 wherein said purging comprises flushing the blowing head with an inert gas.

4. The method of claim 1 wherein said purging comprises evacuating the blowing head.

5. The method of claim 3 wherein the blowing head is flushed with inert gas prior to heating the blowing head.

6. The method of claim 1 wherein said oxygen-containing gas is one of air and oxygen-enriched air.

7. The method of claim 1 wherein the blowing head is heated by band heaters installed around the blowing head.

* * * * *